(12) United States Patent
Weston et al.

(10) Patent No.: US 10,195,916 B2
(45) Date of Patent: Feb. 5, 2019

(54) SUSPENSION ISOLATION PORTIONS, AND SUSPENSION MEMBERS INCORPORATING SAME

(71) Applicant: FORD GLOBAL TECHNOLOGIES, LLC, Dearborn, MI (US)

(72) Inventors: Keith Weston, Canton, MI (US); Jorge Rivas, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 202 days.

(21) Appl. No.: 14/887,585

(22) Filed: Oct. 20, 2015

(65) Prior Publication Data

US 2017/0106711 A1    Apr. 20, 2017

(51) Int. Cl.
*B60G 3/02* (2006.01)
*B60G 13/08* (2006.01)

(52) U.S. Cl.
CPC .......... *B60G 13/08* (2013.01); *B60G 2202/24* (2013.01); *B60G 2206/41* (2013.01); *B60G 2206/70* (2013.01); *B60G 2206/80* (2013.01)

(58) Field of Classification Search
CPC ...... F16F 9/466; F16F 2230/16; B60G 7/003; B60G 7/006; B60G 17/0152; B60G 2800/246; B60G 2200/462; B60G 2202/414; B60G 2204/62; B60G 2206/1116; B60G 2800/212; B60G 2200/182
USPC ....... 280/124.128, 124.13, 124.132, 124.134
See application file for complete search history.

(56) References Cited

U.S. PATENT DOCUMENTS

| | | | | |
|---|---|---|---|---|
| 4,706,989 A * | 11/1987 | Iijima | ................... | B60G 7/006 180/414 |
| 4,998,748 A * | 3/1991 | Kashiwagi | ............... | B60G 3/26 280/124.144 |
| 5,807,010 A * | 9/1998 | Parker | ................ | B60G 21/0551 280/124.107 |
| 6,135,469 A * | 10/2000 | Hulstein | ................... | B60G 7/02 180/24.02 |
| 6,773,002 B2 | 8/2004 | Adoline et al. | | |
| 7,354,054 B2 * | 4/2008 | Pazdirek | ................ | B60G 11/12 280/124.152 |
| 7,984,915 B2 * | 7/2011 | Post, II | ................... | F16F 9/466 280/124.128 |
| 8,056,912 B2 | 11/2011 | Kawabe et al. | | |
| 8,419,031 B1 * | 4/2013 | Verbowski | ............. | B60G 7/001 280/124.134 |
| 8,534,433 B2 * | 9/2013 | Kramer | .................. | B60G 7/003 188/266.6 |
| 9,205,717 B2 * | 12/2015 | Brady | .................... | B60G 17/06 |

(Continued)

FOREIGN PATENT DOCUMENTS

| | | |
|---|---|---|
| CN | 203198680 U | 9/2013 |
| JP | 2005106293 A | 4/2005 |
| WO | 2015014439 A1 | 2/2015 |

*Primary Examiner* — Toan C To
(74) *Attorney, Agent, or Firm* — Jones Robb, PLLC; Franklin Mackenzie

(57) ABSTRACT

An isolation portion for a suspension member may include a substantially monolithic material configured to couple to a connected end of each of a first link and second link of the suspension member. The substantially monolithic material may be configured to dampen a vibration between the first link and the second link.

22 Claims, 3 Drawing Sheets

(56) References Cited

U.S. PATENT DOCUMENTS

2006/0027954 A1\* 2/2006 Nesbitt ................ B60G 15/12
267/64.11
2012/0261869 A1\* 10/2012 Rodenbeck ............ B60G 17/08
267/219

\* cited by examiner

SUSPENSION ISOLATION PORTIONS, AND SUSPENSION MEMBERS INCORPORATING SAME

TECHNICAL FIELD

The present disclosure relates generally to suspension systems, and more particularly, suspension members for suspension systems.

BACKGROUND

Vehicle suspension systems include, among other things, suspension members, which may rotate, be displaced, or remain fixed in response to forces applied to their free ends (i.e., attachment points). The free ends of each suspension member are, for example, generally coupled to other components or assemblies of the vehicle and may allow the rotation and/or displacement of the suspension member as, for example, a wheel associated with the member travels over an uneven surface. The free ends can also allow the suspension member to remain fixed while holding an object in position, such as, for example, an engine of the vehicle. Suspension members may, however, also experience vibrations at their free ends, which are caused by the movement and operation of the components and assemblies to which they are coupled.

Accordingly, suspension members may generally include bushings, or isolation features, at their free ends, which are configured to dampen such vibrations and prevent them from being transmitted through the suspension member. The design and tuning of such bushings, however, is typically limited by the package constraints of the suspension system and the durability requirements imposed by such constraints (i.e., by the limited bushing volume).

It may, therefore, be desirable to provide isolation features for suspension members that are relatively unhindered by package space constraints, thereby increasing the design options for such features, while also improving their durability.

SUMMARY

In accordance with various exemplary embodiments, an isolation portion for a suspension member may include a substantially monolithic material configured to couple to a connected end of each of a first link and second link of the suspension member. The substantially monolithic material may be configured to dampen a vibration between the first link and the second link.

In accordance with various additional exemplary embodiments, a suspension member may include first and second links, each link comprising a connected end and a free end. The suspension member may also include an isolation portion positioned between and attached to the connected ends of the first and second links, respectively. The isolation portion may be configured to dampen vibrations between the free ends of the links.

In accordance with various further exemplary embodiments, a method of constructing a suspension member may include positioning an isolation portion between first and second links of the suspension member. The first and second links may each comprise a first, connected end configured to attach to the isolation member and a second, exterior end forming a free end of the suspension member. The method may also include attaching the first ends of the links to the isolation portion such that the isolation portion minimizes transmission of vibration along a length of the suspension member between the second ends of the suspension member.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages of the present disclosure will be apparent from the following detailed description of exemplary embodiments consistent therewith, which description should be considered with reference to the accompanying drawings, wherein.

Although the following detailed description makes reference to exemplary embodiments, many alternatives, modifications, and variations thereof will be apparent to those skilled in the art. Accordingly, it is intended that the claimed subject matter be viewed broadly.

DESCRIPTION OF EXEMPLARY EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

In accordance with various exemplary embodiments, the present disclosure contemplates suspension members which utilize isolation portions integrated within the members to dampen, or minimize the transmission of, vibrations along a length of the suspension member, thereby eliminating the need for separate bushings, for example, at the free ends of the member. For instance, the exemplary embodiments described herein utilize the flexibility of such isolation portions, relative to the other portions of the member, to apply a countering force to dampen vibrations applied to the member.

Various exemplary embodiments described herein, for example, contemplate a suspension member that includes two links, each link having a first, connected end and a second, exterior end. The links are configured to be aligned such that their connected ends are positioned adjacent to one another, or end-to-end, within an internal portion of the suspension member, and their exterior ends form the free ends of the suspension member. An isolation portion is positioned between the links and is connected to each of the connected ends of the links, such that the links and the isolation portion are all aligned along a longitudinal axis of the suspension member. In this manner, vibrations must travel through the isolation member to be transmitted between the links. In other words, the isolation portion may dampen the vibrations between the free ends of the links (i.e., a vibration felt at one free end will be dampened by the isolation member before reaching the other free end).

Figure 1:
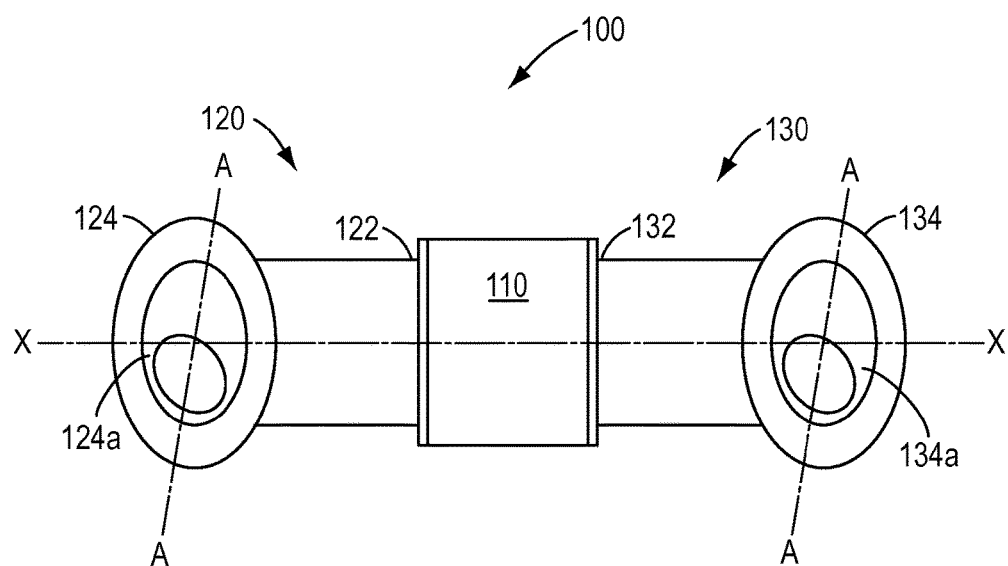
FIG. 1 is a plan view of an exemplary embodiment of a suspension member in accordance with the present disclosure.

FIG. 1 illustrates an exemplary embodiment of a suspension member 100 in accordance with the present disclosure. In accordance with various exemplary embodiments, to dampen and prevent the transmission of vibrations through the suspension member 100, the suspension member 100 includes an isolation portion 110. The isolation portion 110 is, for example, disposed between first and second links 120, 130 of the suspension member 100. In various exemplary embodiments, the isolation portion 110 is positioned between and coupled to opposite connected ends 122, 132 of the respective first and second links 120, 130, via, for example, a butt end attachment. In this manner, as shown in FIG. 1, the first and second links 120, 130 and the isolation portion 110 are all aligned along a longitudinal axis X of the suspension member 100.

Each of the first and second links 120, 130 also includes a respective free end 124, 134 that is positioned opposite each respective connected end 122, 132. The free ends 124, 134 may, for example, be configured to couple to other components or assemblies of the vehicle (not shown). In this manner, the free ends 124, 134 may include joints 124a, 134a, such as, for example, Heim joints, which have a degree of articulation, such that the suspension member is allowed to articulate about an articulation axes A, as, for example, the suspension system moves and/or vibrates. Thus, since an isolation feature (i.e., the isolation portion 110) is incorporated within the suspension member 100 itself, separate bushings are not required at the free ends 124, 134 to dampen the vibrational forces. The suspension member 100 may, therefore, instead have articulating joints 124a, 134a at its free ends 124, 134, which may rotate such that the articulation axis A of the suspension member 100 may be oriented in different directions as, for example, a wheel associated with the member travels over an uneven surface. Thus, the suspension member 100 may afford the components or assemblies to which it is attached an additional freedom of movement (i.e., in addition to rotation), such as, for example, tilting.

Those of ordinary skill in the art would understand, however, that the suspension member 100 disclosed and described with reference to FIG. 1 is exemplary only, and that suspension members in accordance with the present disclosure may incorporate various numbers, types, shapes, and/or configurations of isolation portions 110, links 120, 130, and joints 124a, 134a without departing from the scope of the present disclosure and claims. Furthermore, the isolation portion 110 may be coupled between the links 120, 130 (i.e., to the connected ends 122, 132) using any known methods and/or techniques. Various additional embodiments of the present disclosure contemplate, for example, suspension members incorporating multiple isolation portions, and multiple links to accommodate such isolation portions (e.g., members including two isolation portions coupled between three links).

Figure 2:
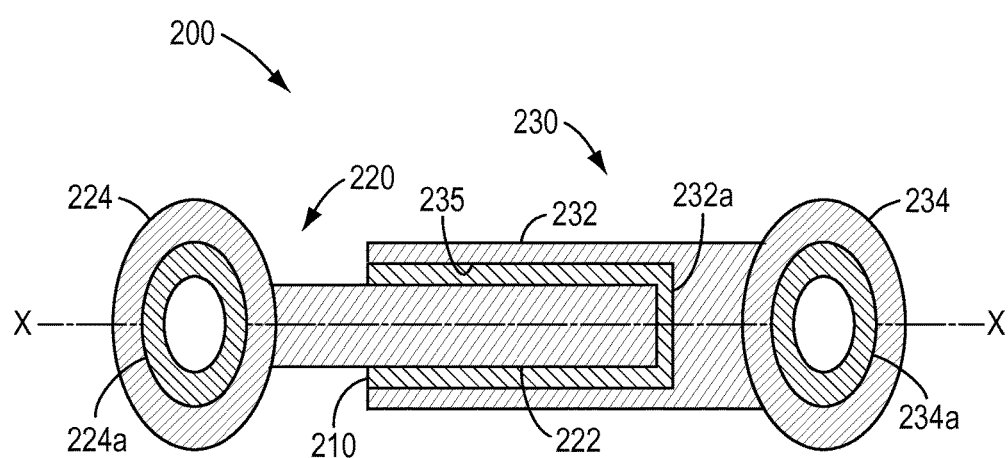
FIG. 2 is a sectional plan view of another exemplary embodiment of a suspension member in accordance with the present disclosure.
Figure 3:
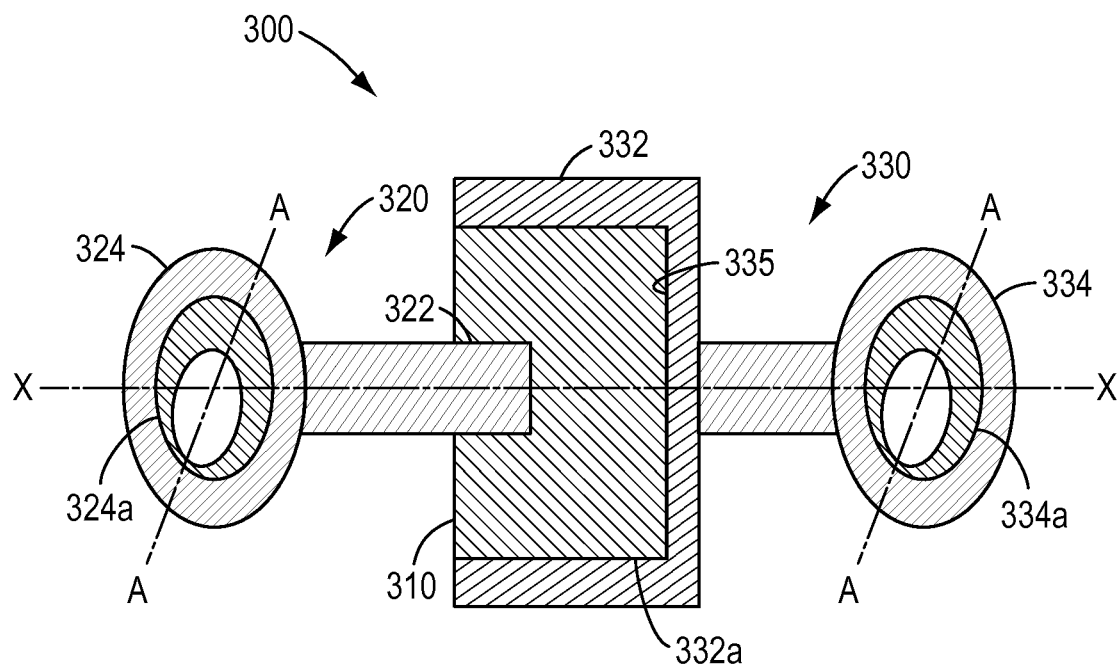
FIG. 3 is a sectional plan view of yet another exemplary embodiment of a suspension member in accordance with the present disclosure.
Figure 4:
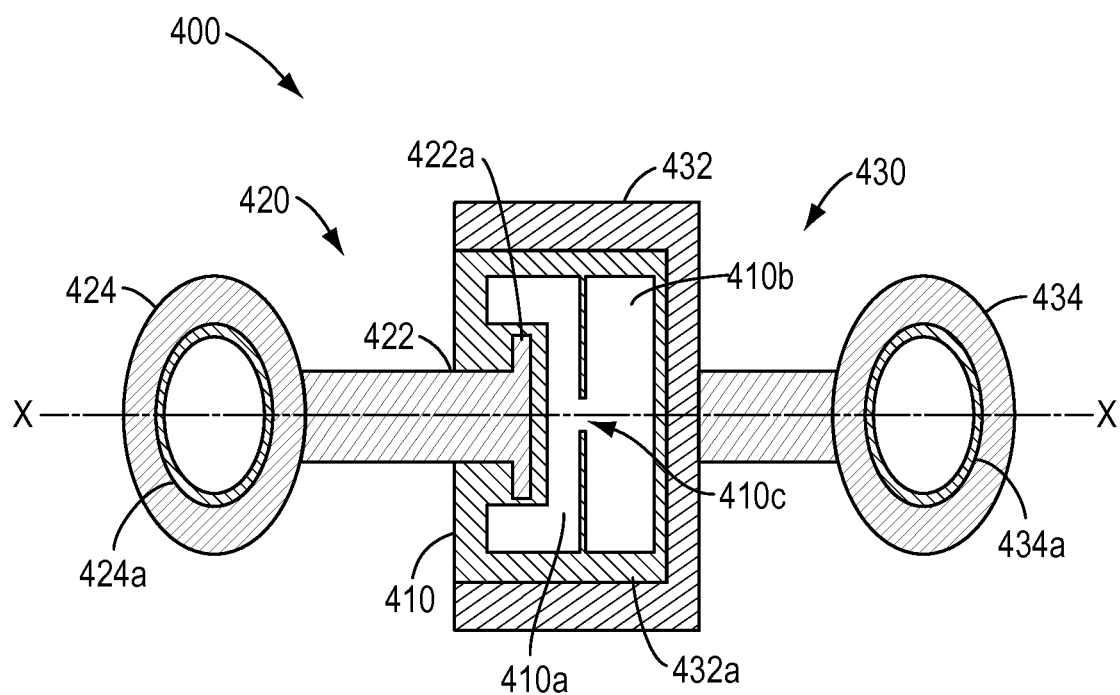
FIG. 4 is a sectional plan view of yet another exemplary embodiment of a suspension member in accordance with the present disclosure.

FIGS. 2-4, for example, illustrate various additional exemplary embodiments of suspension members, incorporating isolation portions, in accordance with the present disclosure. With reference to FIG. 2, a suspension member 200 includes an isolation portion 210. Similar to the suspension member 100 of FIG. 1, the isolation portion 210 is disposed between first and second links 220, 230 of the suspension member 200, where it is coupled to opposite connected ends 222, 232 of the respective first and second links 220, 230. The first and second links 220, 230 also include free ends 224, 234. Unlike, the suspension member 100, however, the free ends 224, 234 include bushings 224a, 234a instead of joints. Although the suspension member itself incorporates an isolation feature (the isolation member 210), in various applications, such as, for example, vehicle racing, it may still be desirable to use bushings to afford more precise tuning of the damping capabilities of the suspension system, as described in more detail below.

As illustrated in FIG. 2, the connected end 232 of the second link 230 includes a recess 232a configured to receive the connected end 222 of the first link 220. In various embodiments, for example, the second link 230 may define a rectangular slot 232a extending along a longitudinal axis X of the suspension member 200, and the first link 220 may extend into the slot 232a, such that the longitudinal lengths of the first and second links 220, 230 are aligned along the longitudinal axis X of the suspension member 200.

The isolation portion 210 may be disposed along an interior surface 235 of the recess 232a, such that the isolation portion 210 is positioned within the recess 232a between the first and second links 220, 230. In this manner, the isolation portion 210 may fully surround the connected end 222 of first link 220 (which is within the slot 232a) to increase the attachment area between the isolation portion 210 and the connected ends 222, 232 of the first and second links 220, 230. Additionally, in such a configuration, the volume of the isolation portion 210 may be limited, such that the volume is relatively small compared with the volume of the bushings 224a, 234a at the free ends 224 and 234. As above, however, those of ordinary skill in the art would understand that the suspension member 200 may have various configurations, including links 220, 230 having various shapes and configurations for connection therebetween, and the isolation portion 210 may have various shapes, with various volumes and attachment areas (i.e., between the isolation portion 210 and the connected ends 222, 232).

FIG. 3, for example, illustrates a suspension member 300 including an isolation portion 310 with an increased volume. Similar to the suspension member 200 of FIG. 2, the suspension member 300 includes a first link 320 having a connected end 322 and a free end 324; and a second link 330 having a connected end 332 and a free end 334. The connected end 332 of the second link 330 includes a recess 332a configured to receive the connected end 322 of the first link 320. And, the isolation portion 310 is disposed between the first and second links 320, 330, where it is positioned along the interior surface 335 of the recess 332a such that the isolation portion 310 surrounds the connected end 322 of first link 320.

As illustrated in FIG. 3, however, the first link 320 only extends partially into the recess 332a in the second link 330, thereby creating a comparatively larger volume (i.e., between the first and second links 320, 330) for the isolation member 310 to fill. Accordingly, the isolation portion 310 has a larger volume than the isolation portion 210 shown in FIG. 2, which may provide an increased tuning range, improved isolation, and a better ability to optimize the overall chassis system behavior. Additionally, the increased amount of space between the connected ends 222, 322 (i.e., since the connected end 322 does not extend as far into the isolation portion 310 as the connected end 222 shown in FIG. 2) allows more relative movement between the links 320, 330 (i.e., compared to the links 220, 230 shown in FIG. 2).

Similar to the suspension member 100 of FIG. 1, the free ends 324, 334 of the links 320, 330 may also include joints 324a, 334a with an articulation axes A.

FIG. 4 illustrates a suspension member 400 including a hollow isolation portion 410 with chambers 410a and 410b. Similar to the suspension members 200 and 300 of FIGS. 2 and 3, the suspension member 400 includes a first link 420 having a connected end 422 and a free end 424; and a second link 430 having a connected end 432 and a free end 434. The connected end 432 of the second link 430 includes a recess 432a configured to receive the connected end 422 of the first link 420. And, the isolation portion 410 is disposed within the recess 432a between the first and second links 420, 430 to fill the space created between the links 420, 430.

The connected end 422 of the first link 420 includes a flange 422a, which extends into the isolation portion 410 in a transverse direction relative to a longitudinal axis X of the suspension member 400. The flange 422a may, for example, increase the surface area of the attachment area between the isolation portion 410 and the connected end 422. Accordingly, with such a configuration, the forces between the connected end 422 (i.e., the flange 422a) and the isolation portion are normal, in contrast to the shear forces that may be present in the suspension members 200, 300 shown in FIGS. 2 and 3.

As shown in FIG. 4, the isolation portion 410 includes a first chamber 410a, a second chamber 410b, and an opening 410c between the chambers 410a and 410b. The first and second chambers 410a, 410b may be filled with a fluid. In various embodiments, for example, the chambers 410a, 410b may be filled with a compressible fluid, such as, for example, air. While in various additional embodiments the chambers 410a, 410b may be filled with an incompressible fluid, such as, for example, a hydraulic fluid. In such a configuration, when the links 420, 430 move relative to each other, the fluid in the first and second chambers 410a, 410b may be displaced through an opening 410c between the chambers 410a, 410b. In accordance with various embodiments, the dimensions of the opening 410c, such as, for example, the diameter of the opening 410c can be tuned to change the flow rate of the fluid between the chambers 410a, 410b, and, therefore, the damping properties of the isolation portion 410.

As above, those of ordinary skill in the art would understand that the suspension member 400 is exemplary only and may have various configurations, including isolation portions 410 having various numbers and/or configurations of chambers and/or openings to achieve the desired damping characteristics of the isolation portion 410.

The isolation portions 110, 210, 310, 410 may be made of a substantially monolithic material, such as, for example, rubber, multi-cellular polyurethane (MCU), or any other material commonly used, for example, in bushings to dampen vibrations. In accordance with various embodiments, such as those described with reference to FIGS. 1-3, the isolation portion 110, 210, 310 may be made of a substantially solid material (i.e., without voids or spaces). While, in various additional embodiments, such as those described with reference to FIG. 4, the isolation portion 410 may be hollow, and include chambers that are enclosed by the substantially monolithic material. As above, however, those of ordinary skill in the art would understand that isolation portions in accordance with the present teachings may have various configurations and be made of various materials. Furthermore, it would be appreciated that an isolation portion may be designed to achieve a desired set of mechanical features. For example, the properties of the isolation portion may be selected based on the desired vibration damping characteristics, stress-strain ratios, and/or tensile strengths. Furthermore, the size (e.g., volume), shape, and dimensions (e.g., width and length) of the monolithic material (i.e., that forms the isolation portion) may be selected based on the desired damping.

Similarly, in embodiments having chambers, the size and dimensions of the chambers, the opening between the chambers, and the viscosity and density of the fluid that fills the chambers, may be selected based on the desired damping.

The dimensions of each isolation portion 110, 210, 310, 410 may also be selected to define the attachment areas between the isolation portion and the connected ends 122, 222, 322, 422 and 132, 232, 332, 432 of each respective link 120, 220, 320, 420 and 130, 230, 330, 430. Furthermore, the isolation portions 110, 210, 310, 410 may be attached to the links via any known method and/or technique, including, for example, a bond formed between the monolithic material of the isolation portion and the material of the links, mating surface features (e.g., grooves), and/or adhesives and bonding agents.

The first and second links 120, 220, 320, 420 and 130, 230, 330, 430 may be made of a substantially rigid material, such as, for example, steel, or other metal alloy, although any suitable material may be employed. In various embodiments, each of the first and second links 120, 220, 320, 420 and 130, 230, 330, 430 is a single integral piece, while in various additional embodiments, the links 120, 220, 320, 420 and 130, 230, 330, 430 may include an assembly that forms a substantially rigid structure. Similar to the isolation portions, the dimensions of the links 120, 220, 320, 420 and 130, 230, 330, 430 may also be selected based on the design requirements of the suspension system (e.g., to ensure that the suspension member 100, 200, 300, 400 has sufficient strength to support, hold, and/or stabilize the component and/or assembly to which it is coupled).

Due to the rigidity of the links 120, 220, 320, 420 and 130, 230, 330, 430, without an isolation feature (e.g., a damper), a vibration at one free end would be transmitted along the entire longitudinal length of the suspension member 100, 200, 300, 400 to the other free end. In accordance with the present disclosure, however, since the links 120, 220, 320, 420 and 130, 230, 330, 430 are coupled to each other via the isolation portion, 110, 210, 310, 410; the isolation portion 110, 210, 310, 410 may prevent the transmission of vibrations from one end to the other. In other words, the isolation portion 110, 210, 310, 410 may isolate and dampen out the vibration as it travels along the longitudinal length of the suspension member 100, 200, 300, 400.

The attachment formed between the isolation portion 110, 210, 310, 410 and the connected ends of the links 120, 220, 320, 420 and 130, 230, 330, 430 may, for example, allow the isolation portion 110, 210, 310, 410 to retain the relative position of the connected ends 122, 222, 322, 422 and 132, 232, 332, 432 with respect to one another, while also damping and/or preventing transmission of the vibration through the suspension member 100, 200, 300, 400. In accordance with various embodiments, for example, the isolation portion 110, 210, 310, 410 may flex due to forces applied by one or more of the links 120, 220, 320, 420 and 130, 230, 330, 430 (via the connected ends 122, 222, 322, 422 and 132, 232, 332, 432) to the isolation portion 110, 210, 310, 410. This flexing allows the isolation portion 110, 210, 310, 410 to apply a countering force that helps to minimize the relative displacement of the connected ends 122, 222, 322, 422 and 132, 232, 332, 432 with respect to one another. And, when the force is removed, the isolation portion 110, 210, 310, 410 may pull the connected ends 122, 222, 322, 422 and 132, 232, 332, 432 back to their relative starting positions.

Isolation portions in accordance with the present disclosure may dampen the vibrations transmitted through the suspension members (i.e., between the first and second link portions) by varying amounts. The isolation portions may, for example, prevent a vibration from being transmitted and/or minimize the vibration that is transmitted by dampening the vibration to an acceptable level. In this manner, the flexibility of the isolation member may be chosen based on its intended application.

Figure 5:
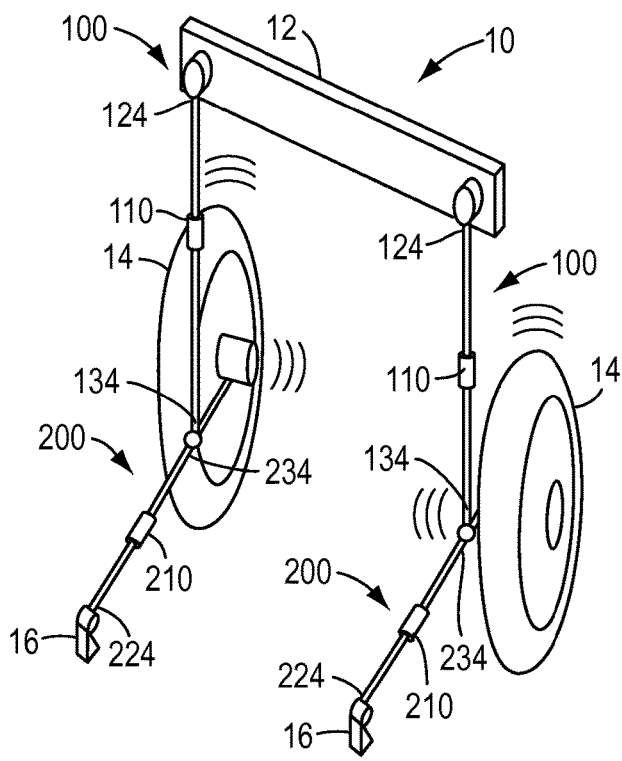
FIG. 5 is a perspective view of a suspension system incorporating the suspension members of FIGS. 1 and 2.
Figure 6:
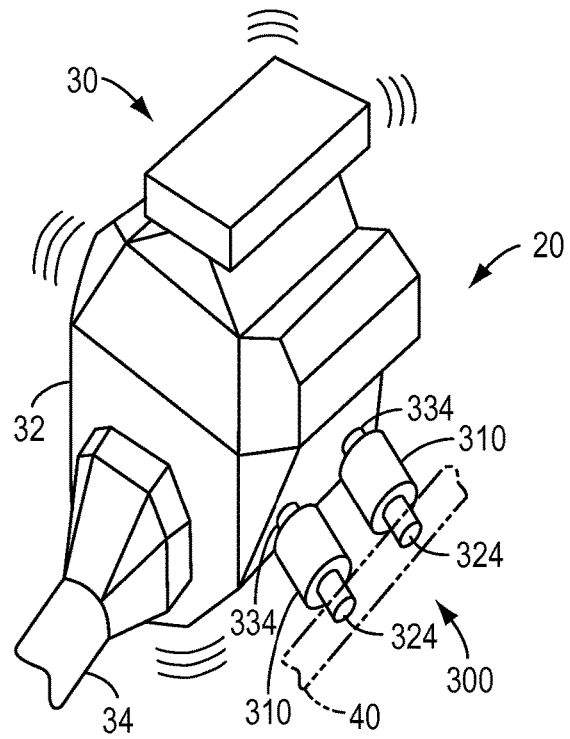
FIG. 6 is a perspective view of a suspension system incorporating the suspension member of FIG. 3.

With reference now to FIGS. 5 and 6, two exemplary suspension systems, which incorporate suspension members in accordance with the present disclosure, are shown. FIG. 5, for example, illustrates an exemplary suspension system 10, which incorporates the suspension members 100 and 200 of FIGS. 1 and 2. The suspension system 10 includes a control arm 12 that may be coupled to a vehicle's frame with a spring/damper system (not shown). As shown in FIG. 5, the free ends 124 of a first pair of suspension members 100 are rotatably coupled to each end of the control arm 12, and the free ends 134 of the first pair of suspension members 100 are rotatably coupled to a second pair of suspension members 200. The free ends 224 of the second pair of suspension members 200 are coupled to wheels 14 of the vehicle (not shown), and the free ends 232 of the second pair of suspension members 200 are rotatably coupled to pivots 16.

In this manner, as the wheels 14 move over an uneven surface, the first pair of suspension members 100 may move the control arm 12 up and down. In other words, they function as links in the suspension system 10. In response to this movement, the second pair of suspension members 200 may rotate about the pivots 16. The movement of the wheels 14 also produces a vibration that is transmitted from the wheels 14 to the free ends 134, 234 proximate the wheels 14, and the free ends 134, 234 transmit the vibration to their respective isolation portions 110, 210. As described above, the isolation portions 110, 210 may then dampen the transmission of the vibration to the other free ends 124, 224, which are coupled respectively to the control arm 12 and the pivots 16. The vehicle's frame will, therefore, receive a dampened vibration.

As illustrated in FIG. 5, the isolation portions 110, 210 are disposed approximately midway between the free ends of the suspension members 100, 200. This location may afford more space for the isolation portions 110, 210 than, for example, somewhere closer to one of the free ends 124, 134, 224, 234, thereby allowing more design freedom to select the properties and characteristics of the isolation portions 110, 210. In addition, parasitic friction forces associated with the movement of bushings at joints or attachments points are also avoided by such a location.

Those of ordinary skill in the art would understand, however, that the suspension system 10 illustrated and described with reference to FIG. 5 is exemplary only, and that although the suspension members 100, 200 employed are described as being part of a suspension system that moderates the vibration and movements associated with a vehicle's wheels traveling over a road surface, various other types of suspension systems may be used.

FIG. 6, for example, illustrates an exemplary suspension system 20, which incorporates the suspension members 300 of FIG. 3 to hold an engine within an engine bay. The suspension system 20, for example, includes a pair of suspension members 300. The free ends 334 of the suspension members 300 are coupled to an engine assembly 30, and the other free ends 324 are coupled to the vehicle's frame 40. The engine assembly 30 is comprised of an engine block 32 and a transmission 34, and may vibrate due to the movement of internal components, such as, for example, pistons, a crankshaft, valves, cams, or the like, within the block 32 and transmission 34. The vibration is transmitted from the free ends 334 (which are coupled to the engine block 30) to the isolation portions 310, where the isolation portions 310 may dampen the vibration. The vehicle's frame 40 will, therefore, receive dampened vibrations.

As shown in FIG. 6, the isolation portions 310 in the suspension members 300 are relatively large compared to, for example, the isolation portions 110, 210 shown in FIG. 5. There may also be a relatively large gap between the first ends 322, 332 (see FIG. 3) of the suspension members 300. In this manner, the isolation portions 310 may be partially deformed by the engine torque, while consistently damping the vibration between the free ends 234, 334.

As illustrated and described with reference to the exemplary embodiments, incorporating an isolation member within a suspension member can eliminate the need for bushings, for example, at the free ends of the members. Eliminating such bushings may reduce the number of parts required in the suspension member, thereby reducing the material cost of the suspension member and the assembly and maintenance costs associated with more complex assemblies, as well as freeing up package space thereby allowing for previously infeasible package solutions.

Furthermore, suspension members in accordance with the present disclosure may have wider applications. For example, a suspension system may be employed in a luxury automobile where low vibration is more desirable compared to, for example, a racing vehicle where a firm suspension is generally desired to enhance tire traction and vehicle cornering performance. To this end, the isolation portions of the present disclosure may allow for the tuning of the suspension system, and the isolation portions may be replaced along with, for example, the bushings to achieve a desired result (which, for example, in racing may not always necessarily be a minimized vibration). For example, in racing vehicles, the isolation portion may be swapped between test runs of the racing vehicle to improve lap times. The improvements in the lap times may be correlated, for example, with a desired damping of the vibration transmitted between the free ends of the suspension members of the vehicle.

While the present disclosure has been disclosed in terms of exemplary embodiments in order to facilitate better understanding of the present disclosure, it should be appreciated that the present disclosure can be embodied in various ways without departing from the principle of the disclosure.

Therefore, the present disclosure should be understood to include all possible embodiments which can be embodied without departing from the principle of the disclosure set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present disclosure. It is to be understood that the various embodiments shown and described herein are to be taken as exemplary. Elements and materials, and arrangements of those elements and materials, may be substituted for those illustrated and described herein, parts and processes may be reversed, and certain features of the present disclosure may be utilized independently, all as would be apparent to one skilled in the art after having the benefit of the description herein. Changes may be made in the elements described herein without departing from the spirit and scope of the present disclosure and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

What is claimed is:

1. An isolation portion for a suspension member, comprising:
   a substantially monolithic material configured to couple to a connected end of each of a first link and second link of the suspension member;
   wherein the substantially monolithic material is disposed along an entire interior surface of a recess within at least one of the first and second links to dampen a vibration between the first link and the second link.

2. The isolation portion of claim 1, wherein the isolation portion is configured to flex to allow the connected ends of the links to move relative to each other.

3. The isolation portion of claim 1, wherein the substantially monolithic material is configured to surround at least one of the connected ends of the first and second links.

4. The isolation portion of claim 1, wherein the substantially monolithic material is configured to abut at least one of the connected ends of the first and second links.

5. The isolation portion of claim 1, wherein the substantially monolithic material is comprised of an elastomeric material.

6. The isolation portion of claim 1, wherein the substantially monolithic material includes one or more fluid-filled chambers configured to dampen the vibration.

7. A suspension member, comprising:
   first and second links, each link comprising a connected end and a free end; and
   an isolation portion positioned between and attached to the connected ends of the first and second links, respectively, the isolation portion being configured to dampen vibrations between the free ends of the links and to flex to allow the connected ends of the links to move relative to each other.

8. The suspension member of claim 7, wherein the isolation portion comprises a substantially monolithic material configured to attach to the connected ends of the links.

9. The suspension member of claim 7, wherein the isolation portion comprises a substantially monolithic material, the substantially monolithic material including one or more fluid-filled chambers configured to dampen the vibrations.

10. The suspension member of claim 7, wherein at least one of the free ends includes a bushing.

11. The suspension member of claim 7, wherein at least one of the free ends comprises a joint with at least one degree of articulation.

12. The suspension member of claim 7, wherein the first and second links are substantially aligned along a longitudinal axis of the suspension member.

13. The suspension member of claim 7, wherein the isolation portion is disposed approximately midway between the free ends.

14. The suspension member of claim 7, wherein the isolation portion is removably attached to the connected ends of the first and second links.

15. The suspension member of claim 7, wherein at least one of the connected ends of the first and second links forms a recess configured to receive the isolation portion.

16. The suspension member of claim 15, wherein the isolation portion is disposed along at least a portion of an interior surface of the recess.

17. A method of constructing a suspension member, comprising:
   positioning an isolation portion between first and second links of the suspension member, the first and second links each comprising a first, connected end configured to attach to the isolation portion and a second, exterior end forming a free end of the suspension member; and
   attaching the first ends of the links to the isolation portion such that the isolation portion may flex to permit relative motion between the first ends of the links while minimizing transmission of vibration along a length of the suspension member between the second ends of the links.

18. The method of claim 17, further comprising forming the isolation portion of a substantially monolithic material.

19. The method of claim 17, further comprising forming the isolation portion of a substantially monolithic material with one or more fluid-filled chambers.

20. The method of claim 17, wherein positioning the isolation portion comprises positioning the isolation portion substantially midway between the free ends of the suspension member.

21. The method of claim 17, wherein attaching the isolation portion to the first ends of the links comprises removably attaching the isolation portion to the first ends.

22. The method of claim 17, wherein positioning the isolation portion comprises positioning the isolation portion along at least a portion of an interior surface of a recess within at least one of the first and second links.

* * * * *